(12) United States Patent
Morishige et al.

(10) Patent No.: US 9,004,769 B2
(45) Date of Patent: Apr. 14, 2015

(54) SYNTHETIC RESIN-MADE THRUST SLIDING BEARING

(71) Applicant: Oiles Corporation, Tokyo (JP)

(72) Inventors: Kouichi Morishige, Kanagawa (JP); Ryohei Kaneko, Kanagawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 14/205,863

(22) Filed: Mar. 12, 2014

(65) Prior Publication Data

US 2014/0199007 A1 Jul. 17, 2014

Related U.S. Application Data

(62) Division of application No. 13/984,651, filed as application No. PCT/JP2012/000980 on Feb. 15, 2012, now Pat. No. 8,708,568.

(30) Foreign Application Priority Data

Feb. 23, 2011 (JP) .................................. 2011-037682

(51) Int. Cl.
 *F16C 17/04* (2006.01)
 *F16C 33/74* (2006.01)
 *F16C 33/20* (2006.01)

(52) U.S. Cl.
 CPC ................. *F16C 17/04* (2013.01); *F16C 33/20* (2013.01); *F16C 33/74* (2013.01)

(58) Field of Classification Search
 CPC ...... F16C 2326/05; F16C 17/04; F16C 33/74; F16C 33/20
 USPC .................................................. 384/420, 147
 See application file for complete search history.

(56) References Cited

U.S. PATENT DOCUMENTS

| 8,016,489 | B2 | 9/2011 | Kaneko et al. |
| 8,328,427 | B2 | 12/2012 | Kellam |
| 8,708,568 | B2 * | 4/2014 | Morishige et al. ............ 384/420 |
| 2003/0210839 | A1 | 11/2003 | Gosis et al. |
| 2010/0104228 | A1 | 4/2010 | Kaneko |
| 2011/0019951 | A1 | 1/2011 | Kaneko |
| 2014/0001689 | A1 | 1/2014 | Kaneko |
| 2014/0010485 | A1 | 1/2014 | Kaneko |

FOREIGN PATENT DOCUMENTS

| JP | 2001-027227 | 1/2001 |
| JP | 2009-257516 | 11/2009 |
| JP | 2010-031949 | 2/2010 |
| JP | 2010-053908 | 3/2010 |

OTHER PUBLICATIONS

International Search Report in PCT/JP2012/000980 dated May 1, 2012.

\* cited by examiner

*Primary Examiner* — Thomas R. Hannon
(74) *Attorney, Agent, or Firm* — Nixon & Vanderhye P.C.

(57) ABSTRACT

A synthetic resin-made thrust sliding bearing 1 includes a synthetic resin-made upper casing 12, a synthetic resin-made lower casing 22, a synthetic resin-made thrust sliding bearing piece 33 interposed between the upper casing 12 and the lower casing 22, an outer elastic seal member 47 having an inner elastically deformable lip portion 43 and an outer elastically deformable lip portion 46, and an inner elastic seal member 54 having an outer elastically deformable lip portion 50 and an inner elastically deformable lip portion 53.

4 Claims, 9 Drawing Sheets

SYNTHETIC RESIN-MADE THRUST SLIDING BEARING

This application is a divisional of application Ser. No. 13/984,651 filed 9 Aug. 2013, now allowed, which in turn is the U.S. national phase of International Application No. PCT/JP2012/000980 filed 15 Feb. 2012 which designated the U.S. and claims priority to JP 2011-037682 filed 23 Feb. 2011, the entire contents of each of which are hereby incorporated by reference.

TECHNICAL FIELD

The present invention relates to a synthetic resin-made thrust sliding bearing.

BACKGROUND ART

Generally, a strut-type suspension used for a front wheel of a four-wheeled vehicle has a structure in which a strut assembly incorporating a hydraulic shock absorber in an outer cylinder integrated with a main shaft is combined with a coil spring. Among such suspensions, there is a type in which when the strut assembly rotates together with the coil spring in the steering operation, the piston rod of the strut assembly rotates, and there is another type in which the piston rod does not rotate. In either type, there are cases where, instead of a rolling bearing, a synthetic resin-made thrust sliding bearing is used between a mechanism for mounting the strut assembly to the vehicle body and an upper spring seat member of the coil spring, so as to allow smooth rotation of the strut assembly.

PRIOR ART DOCUMENTS

Patent Documents

[Patent Document 1] JP-A-2010-53908
[Patent Document 2] JP-A-2010-31949
[Patent Document 3] JP-A-2009-257516

SUMMARY OF THE INVENTION

Problems that the Invention is to Solve

In such a synthetic resin-made thrust sliding bearing including a synthetic resin-made upper casing, a synthetic resin-made lower casing superposed on the upper casing so as to be rotatable about the axis of the upper casing, and a synthetic resin-made thrust sliding bearing piece interposed between the upper casing and the lower casing, labyrinth means making use of gaps between projecting portions are provided on the inner peripheral side and the outer peripheral side between the upper casing and the lower casing in order to prevent the ingress of dust, muddy water and the like into between the upper casing and the lower casing.

However, with such labyrinth means, there are cases where it is impossible to obtain a sufficient effect of preventing the ingress of dust, muddy water and the like under severe conditions, so that should the dust, muddy water and the like enter between the upper casing and the lower casing, smooth relative rotation of the lower casing with respect to the upper casing cannot be obtained, possibly resulting in the generation of abnormal noise.

The present invention has been devised in view of the above-described aspects, and its object is to provide a synthetic resin-made thrust sliding bearing which, even under severe conditions, makes it possible to effectively prevent the ingress of dust, muddy water and the like, and is capable of reducing the generation of abnormal noise due to the ingress of dust, muddy water and the like.

Means for Solving the Problems

A synthetic resin-made thrust sliding bearing in accordance with the present invention comprises: a synthetic resin-made upper casing which includes an upper annular plate-like portion, an outer cylindrical portion formed integrally on an outer annular end portion of the upper annular plate-like portion at an upper annular end portion thereof and suspended downwardly from the outer annular end portion, and an inner cylindrical portion formed integrally on an inner annular end portion of the upper annular plate-like portion at an upper annular end portion thereof and suspended downwardly from the inner annular end portion; a synthetic resin-made lower casing which is superposed on the upper casing so as to be rotatable about an axis of the upper casing and includes a lower annular plate-like portion and a cylindrical portion formed integrally on an annular upper surface of the lower annular plate-like portion and erected uprightly from the annular upper surface; a synthetic resin-made thrust sliding bearing piece which is interposed between the upper casing and the lower casing and includes an annular plate-like portion in contact with an annular lower surface of the upper annular plate-like portion at an annular upper surface thereof so as to be rotatable about the axis of the upper casing and in contact with the annular upper surface of the cylindrical portion of the lower casing at an annular lower surface thereof and a cylindrical portion formed integrally on an inner annular end portion of the annular plate-like portion at an upper annular end portion thereof and suspended downwardly from the inner annular end portion; an outer elastic seal member which is in contact with an outer surface of the cylindrical portion of the lower casing at an inner elastically deformable lip portion thereof formed integrally on a cylindrical inner surface thereof in such a manner as to project diagonally inwardly and upwardly from the cylindrical inner surface and which is in contact with an inner surface of the outer cylindrical portion of the upper casing at an outer elastically deformable lip portion thereof formed integrally on a cylindrical outer surface thereof in such a manner as to project diagonally outwardly and downwardly from the cylindrical outer surface; and an inner elastic seal member which is in contact with an inner surface of the cylindrical portion of the lower casing at an outer elastically deformable lip portion thereof formed integrally on a cylindrical outer surface thereof in such a manner as to project diagonally outwardly and upwardly from the cylindrical outer surface and which is in contact with an outer surface of the inner cylindrical portion of the upper casing at an inner elastically deformable lip portion thereof formed integrally on a cylindrical inner surface thereof in such a manner as to project diagonally inwardly and downwardly from the cylindrical inner surface, wherein an annular lower end surface of the outer cylindrical portion of the upper casing opposes the annular upper surface of the lower annular plate-like portion of the lower casing with a gap therebetween, the inner surface of the outer cylindrical portion of the upper casing has a truncated cone-shaped inner surface which is continuously connected to the lower surface of the upper annular plate-like portion and with which the outer elastically deformable lip portion of the outer elastic seal member is in contact, the outer surface of the cylindrical portion of the lower casing has a small-diameter cylindrical outer surface with which the inner elastically deformable lip portion of the outer elastic seal member is in contact, a large-diameter cylindrical outer surface having a larger diameter than the small-diameter cylindrical outer surface, and an annular stepped surface which is disposed between the small-diameter cylindrical outer surface and the large-diameter cylindrical outer surface and with which an annular lower surface of the outer elastic seal member is in contact, the outer surface of the inner cylindrical portion of the upper casing has a large-diameter cylindrical outer surface which is continuously connected to the lower surface of the upper annular plate-like portion and a small-diameter cylindrical outer surface which is continuously connected to the large-diameter cylindrical outer surface and has a smaller diameter than the large-diameter cylindrical outer surface, and with which the inner elastically deformable lip portion of the inner elastic seal member is in contact, the inner surface of the cylindrical portion of the lower casing has a small-diameter cylindrical inner surface continuously connected to an annular inner surface of the lower annular plate-like portion of the lower casing, a large-diameter cylindrical inner surface having a larger diameter than the small-diameter cylindrical inner surface and continuously connected to the annular upper surface of the cylindrical portion of the lower casing, an intermediate cylindrical inner surface having a larger diameter than the small-diameter cylindrical inner surface but having a smaller diameter than the large-diameter cylindrical inner surface and with which the outer elastically deformable lip portion of the inner elastic seal member is in contact, a lower annular stepped surface which is disposed between the small-diameter cylindrical inner surface and the intermediate cylindrical inner surface and with which an annular lower surface of the inner elastic seal member is in contact, and an upper annular stepped surface disposed between the intermediate cylindrical inner surface and the large-diameter cylindrical inner surface, the annular lower end surface of the inner cylindrical portion of the upper casing, which is continuously connected to the small-diameter cylindrical outer surface of the inner cylindrical portion of the upper casing, opposes the lower annular stepped surface of the cylindrical portion of the lower casing with a gap therebetween, and the cylindrical portion of the thrust sliding bearing piece is disposed between the large-diameter cylindrical outer surface of the outer surface of the inner cylindrical portion of the upper casing and the large-diameter cylindrical inner surface of the inner surface of the cylindrical portion of the lower casing.

According to the synthetic resin-made thrust sliding bearing in accordance with the present invention, the outer elastic seal member is in contact with the small-diameter cylindrical outer surface of the outer surface of the cylindrical portion of the lower casing at its inner elastically deformable lip portion formed integrally on the cylindrical inner surface in such a manner as to project diagonally inwardly and upwardly from that cylindrical inner surface, and is also in contact with the truncated cone-shaped inner surface of the inner surface of the outer cylindrical portion of the upper casing at its outer elastically deformable lip portion formed integrally on the cylindrical outer surface in such a manner as to project diagonally outwardly and downwardly from that cylindrical outer surface, and is further contact with the annular stepped surface of the outer surface of the cylindrical portion of the lower casing at its annular lower surface. The inner elastic seal member is in contact with the intermediate cylindrical inner surface of the inner surface of the cylindrical portion of the lower casing at its outer elastically deformable lip portion formed integrally on the cylindrical inner surface in such a manner as to project diagonally outwardly and upwardly from that cylindrical outer surface, is also in contact with the small-diameter cylindrical outer surface of the outer surface of the inner cylindrical portion of the upper casing at its inner elastically deformable lip portion formed integrally on the cylindrical inner surface in such a manner as to project diagonally inwardly and downwardly from that cylindrical inner surface, and is further in contact with the lower annular stepped surface of the inner surface of the cylindrical portion of the lower casing at its annular lower surface. Therefore, even under severe conditions, it is possible to effectively prevent the ingress of dust, muddy water and the like into an annular space, which is located between the annular lower surface of the upper annular plate-like portion and the annular upper surface of the cylindrical portion of the lower casing to accommodate the annular plate-like portion of the thrust sliding bearing piece, through the annular gap between the annular lower end surface of the outer cylindrical portion of the upper casing and the annular upper surface of the lower annular plate-like portion of the lower casing and through the annular gap between the annular lower end surface of the inner cylindrical portion of the upper casing and the lower annular stepped surface of the cylindrical portion of the lower casing, thereby making it possible to reduce the generation of abnormal noise due to the ingress of dust, muddy water and the like.

In the present invention, the inner surface of the outer cylindrical portion of the upper casing may have a cylindrical inner surface which is continuously connected at an annular upper end thereof to the annular lower end of the truncated cone-shaped inner surface and is continuously connected at an annular lower end thereof to the annular inner edge of the annular lower end surface of the outer cylindrical portion of the upper casing, or the inner surface of the outer cylindrical portion of the upper casing may have an upwardly truncated conical surface continuously connected to the annular lower end of the truncated cone-shaped inner surface at a large-diameter annular upper end thereof and having a small-diameter annular lower end smaller in diameter than the large-diameter annular upper end, and a downwardly truncated conical surface continuously connected to the small-diameter annular lower end of the upwardly truncated conical surface at a small-diameter annular upper end thereof and having a large-diameter annular lower end larger in diameter than the small-diameter annular upper end.

In addition, in the present invention, each of the outer elastic seal member and the inner elastic seal member may include an elastic seal body having corresponding ones of the elastically deformable lip portions and a metal core embedded in the elastic seal body.

In a preferred example, the lower casing may have a plurality of projecting portions formed integrally on the annular upper surface of its cylindrical portion and spaced apart from each other in the direction about the axis, and the annular plate-like portion of the thrust sliding bearing piece may have a plurality of recessed portions or notches for receiving respective ones of the plurality of projecting portions of the lower casing. In consequence of this, the thrust sliding bearing piece concerning the rotation about the axis becomes fixed with respect to the lower casing and becomes rotatable with respect to the upper casing, with the result that the upper casing becomes rotatable with respect to the lower casing about the axis of the upper casing.

In another preferred example, the annular lower surface of the outer elastic seal member may have at least one elastically deformable annular projecting surface, and the annular lower surface of the inner elastic seal member may have at least one elastically deformable annular projecting surface. If such elastically deformable annular projecting surfaces are provided, the sealability of the annular lower surface of the outer elastic seal member and the annular lower surface of the inner elastic seal member can be improved by the elastic deformation of these annular projecting surfaces, so that the ingress of dust, muddy water and the like into the annular space accommodating the annular plate-like portion of the thrust sliding bearing piece can be prevented more effectively, thereby making it possible to more satisfactorily reduce the generation of abnormal noise due to the ingress of dust, muddy water and the like.

In addition, in the present invention, the outer surface of the cylindrical portion of the lower casing may have a radially projecting cylindrical outer surface continuously connected to the annular upper surface of the cylindrical portion at an annular upper edge and having a larger diameter than the small-diameter cylindrical outer surface with which the inner elastically deformable lip portion of the outer elastic seal member is in contact, while the small-diameter cylindrical outer surface, with which the inner elastically deformable lip portion of the outer elastic seal member is in contact, may be disposed in the axial direction between the radially projecting cylindrical outer surface and the annular stepped surface with which the annular lower surface of the outer elastic seal member is in contact, whereas the inner surface of the cylindrical portion of the lower casing may have an axially projecting annular stepped surface which is continuously connected to the annular upper edge of the large-diameter cylindrical inner surface of the cylindrical portion at an annular inner edge thereof and which is closer to an annular lower end surface of the inner cylindrical portion of the upper casing in the axial direction than the lower annular stepped surface with which the annular lower surface of the inner elastic seal member is in contact, while the lower annular stepped surface, with which the annular lower surface of the inner elastic seal member is in contact, may be disposed in the radial direction between the axially projecting annular stepped surface and the intermediate cylindrical inner surface. If such a radially projecting cylindrical outer surface and such an axially projecting annular stepped surface are provided, it is possible to satisfactorily effect the positioning of the outer elastic seal member and the inner elastic seal member.

The upper casing and the lower casing may be formed of a synthetic resin including at least one of polyacetal resin, polyamide resin, thermoplastic polyester resin, polyolefin resin, polycarbonate resin, and fluororesin. The thrust sliding bearing piece may be formed of a synthetic resin including at least one of polyacetal resin, polyamide resin, thermoplastic polyester resin, polyolefin resin, and fluororesin. As for each of the upper casing and the lower casing, a synthetic resin similar to the synthetic resin constituting the thrust sliding bearing piece can be used, but particularly a synthetic resin is used which exhibits satisfactory friction characteristics when combined with the synthetic resin used for the thrust sliding bearing piece. For the thrust sliding bearing piece and the upper and lower casings, it is possible to cite by way of examples the following combinations: a combination of polyacetal resin and polyamide resin; a combination of a polyolefin resin, particularly polyethylene resin, and polyacetal resin; a combination of polyacetal resin and a thermoplastic polyester resin, particularly polybutylene terephthalate resin; and a combination of polyacetal resin and polyacetal resin.

Advantages of the Invention

According to the present invention, it is possible to provide a synthetic resin-made thrust sliding bearing which, even under severe conditions, makes it possible to effectively prevent the ingress of dust, muddy water and the like, and is capable of reducing the generation of abnormal noise due to the ingress of dust, muddy water and the like.

MODE FOR CARRYING OUT THE INVENTION

Hereafter, a more detailed description will be given of the mode for carrying out the invention on the basis of the preferred embodiments illustrated in the drawings. It should be noted that the present invention is not limited to these embodiments.

In FIGS. 1 to 9, a synthetic resin-made thrust sliding bearing 1 of this embodiment is comprised of a synthetic resin-made upper casing 12 which includes an upper annular plate-like portion 2, an outer cylindrical portion 5 formed integrally on an outer annular end portion 3 of the upper annular plate-like portion 2 at its upper annular end portion 4 and suspended downwardly from that outer annular end portion 3, an inner cylindrical portion 8 formed integrally on an inner annular end portion 6 of the upper annular plate-like portion 2 at its upper annular end portion 7 and suspended downwardly from that inner annular end portion 6, and an annular projecting portion 11 having a flat upper surface 10 formed integrally with an annular upper surface 9 of the upper annular plate-like portion 2; a synthetic resin-made lower casing 22 which is superposed on the upper casing 12 so as to be rotatable in an R direction about an axis O of the upper casing 12 and includes a lower annular plate-like portion 15, a cylindrical portion 17 formed integrally on an annular upper surface 16 of the lower annular plate-like portion 15 and erected uprightly from that annular upper surface 16, a suspended cylindrical portion 19 formed integrally on a radially inward side of an annular lower surface 18 of the lower annular plate-like portion 15 and suspended downwardly from that annular lower surface 18, and a plurality of projecting portions 21 formed integrally on a radially outer edge portion of an annular upper surface 20 of the cylindrical portion 17 and spaced apart from each other in the R direction which is a direction about the axis O; a synthetic resin-made thrust sliding bearing piece 33 which is interposed between the upper casing 12 and the lower casing 22 and includes an annular plate-like portion 28 in contact with an annular lower surface 25 of the upper annular plate-like portion 2 at its annular upper surface 26 so as to be rotatable in the R direction about the axis O of the upper casing 12 and also in contact with the annular upper surface 20 of the cylindrical portion 17 of the lower casing 22 at its annular lower surface 27 and a cylindrical portion 31 formed integrally on an inner annular end portion 29 of the annular plate-like portion 28 at its upper annular end portion 30 and suspended downwardly from that inner annular end portion 29; an outer elastic seal member 47 which is in contact with an outer surface 41 of the cylindrical portion 17 of the lower casing 22 at its inner elastically deformable lip portion 43 formed integrally on its cylindrical inner surface 42 in such a manner as to project diagonally inwardly and upwardly from that cylindrical inner surface 42 and which is also in contact with an inner surface 44 of the outer cylindrical portion 5 of the upper casing 12 at its outer elastically deformable lip portion 46 formed integrally on its cylindrical outer surface 45 in such a manner as to project diagonally outwardly and downwardly from that cylindrical outer surface 45; and an inner elastic seal member 54 which is in contact with an inner surface 48 of the cylindrical portion 17 of the lower casing 22 at its outer elastically deformable lip portion 50 formed integrally on its cylindrical outer surface 49 in such a manner as to project diagonally outwardly and upwardly from that cylindrical outer surface 49 and which is also in contact with an outer surface 51 of the inner cylindrical portion 8 of the upper casing 12 at its inner elastically deformable lip portion 53 formed integrally on its cylindrical inner surface 52 in such a manner as to project diagonally inwardly and downwardly from that cylindrical inner surface 52.

Figure 1:
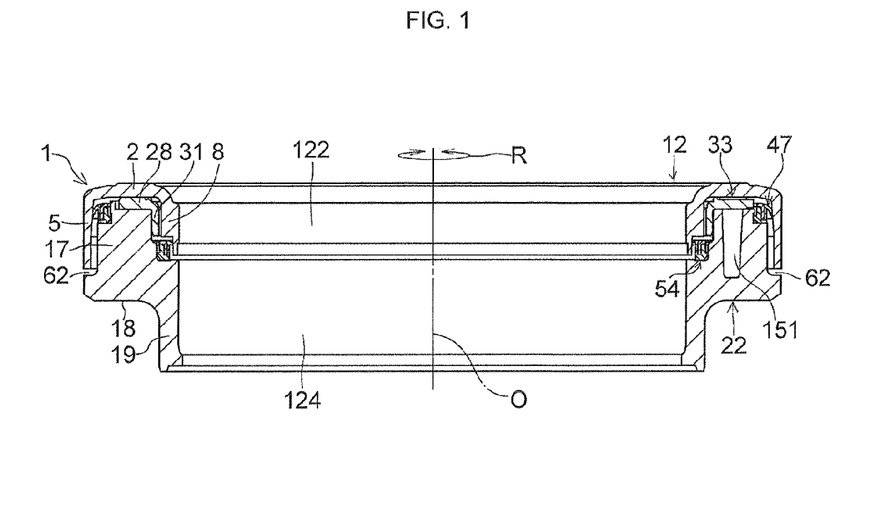
FIG. 1 is an explanatory front cross-sectional view of an embodiment of the present invention.
Figure 2:
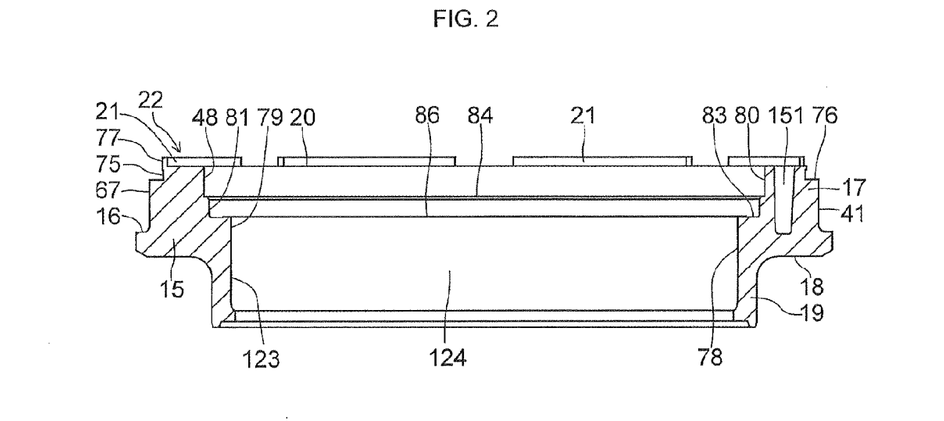
FIG. 2 is an explanatory cross-sectional view, taken in the direction of arrows II-II shown in FIG. 3, of a lower casing shown in FIG. 1.
Figure 3:
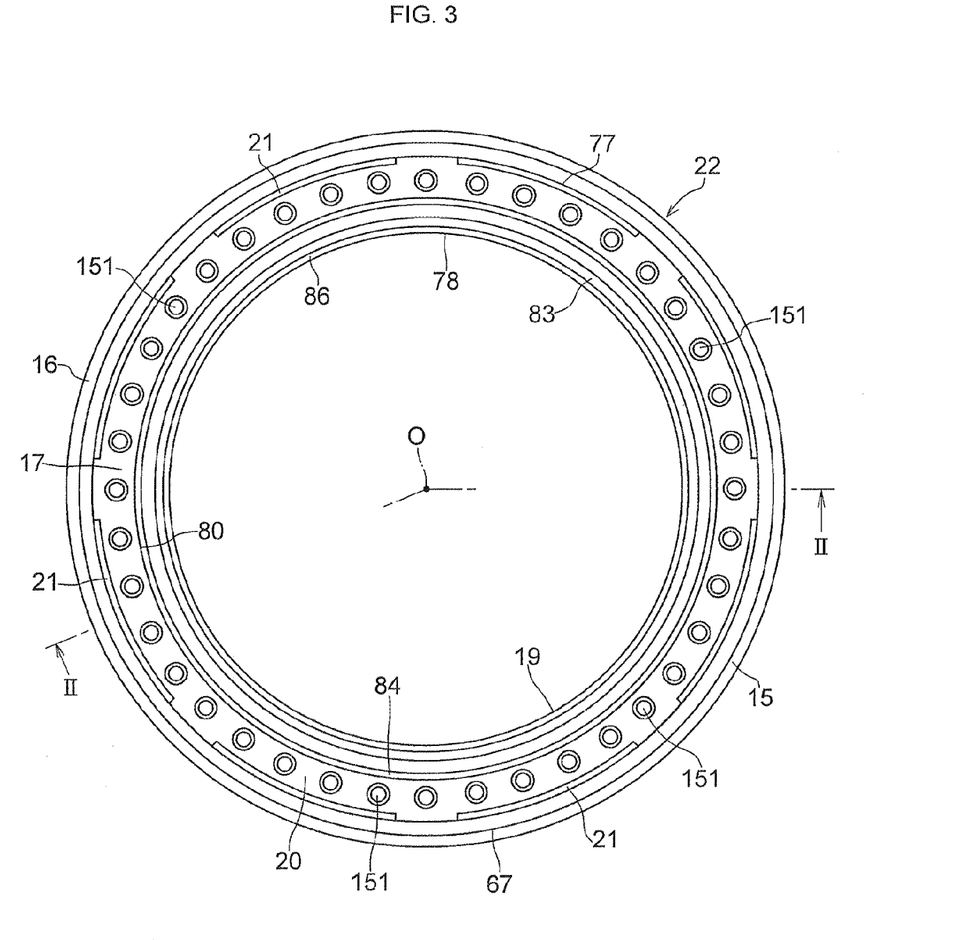
FIG. 3 is an explanatory plan view of the lower casing shown in FIG. 1.
Figure 4:
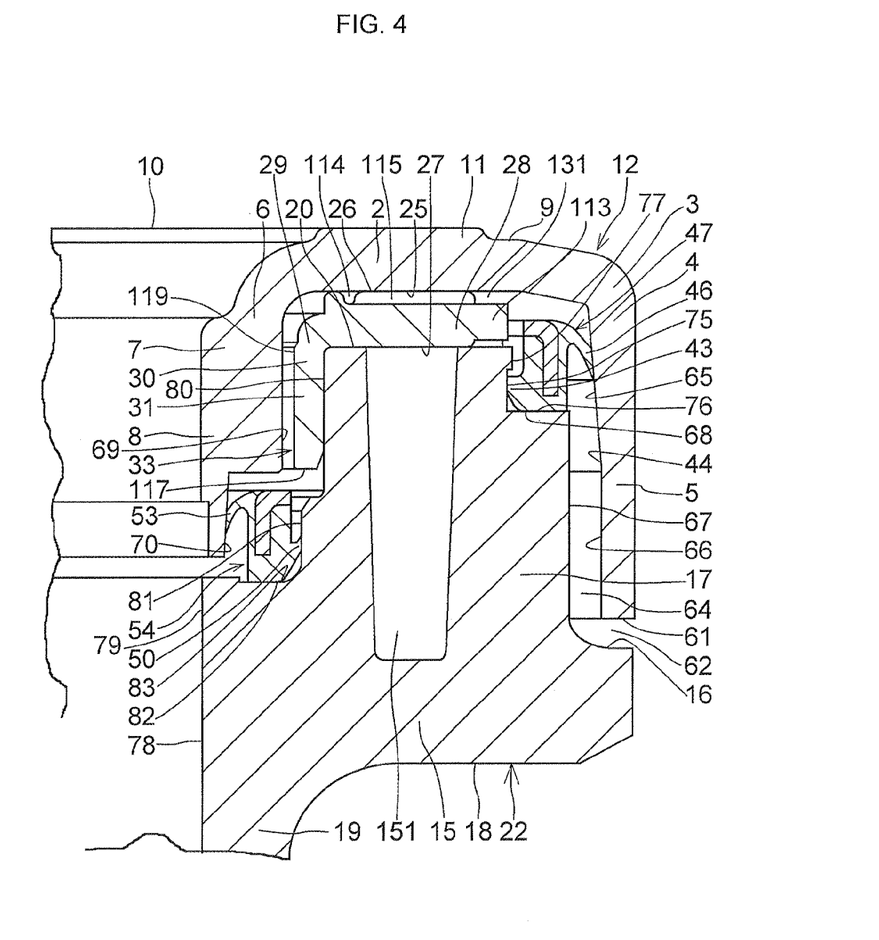
FIG. 4 is an explanatory enlarged front cross-sectional view of a right portion of the embodiment shown in FIG. 1.
Figure 5:
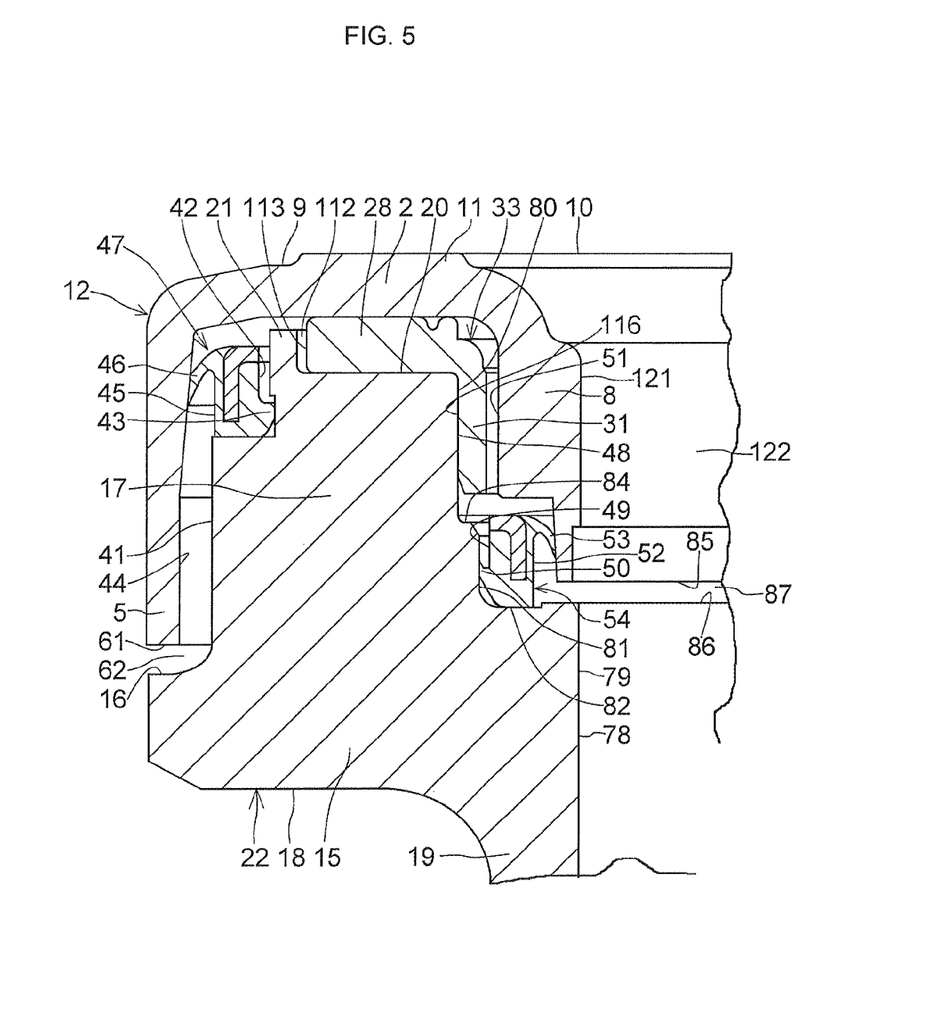
FIG. 5 is an explanatory enlarged front cross-sectional view of a left portion of the embodiment shown in FIG. 1.

In the upper casing 12, an annular lower end surface 61 of its outer cylindrical portion 5 opposes the annular upper surface 16 of the lower annular plate-like portion 15 of the lower casing 22 with an annular gap 62 therebetween, and the inner surface 44 of its outer cylindrical portion 5 has a truncated cone-shaped inner surface 65 which is continuously connected to the lower surface 25 of the upper annular plate-like portion 2 and with which the outer elastically deformable lip portion 46 of the outer elastic seal member 47 is in contact and a cylindrical inner surface 66 which is continuously connected at its annular upper end to the annular lower end of the truncated cone-shaped inner surface 65 and is continuously connected at its annular lower end to the annular inner edge of the annular lower end surface 61, wherein this cylindrical inner surface 66 opposes a large-diameter cylindrical outer surface 67 of the outer surface 41 of the cylindrical portion 17 with a cylindrical gap 64 therebetween, and the outer surface 51 of the inner cylindrical portion 8 has a large-diameter cylindrical outer surface 69 which is continuously connected to the lower surface 25 of the upper annular plate-like portion 2 and a small-diameter cylindrical outer surface 70 which is continuously connected to the large-diameter cylindrical outer surface 69 and has a smaller diameter than that large-diameter cylindrical outer surface 69, and with which the inner elastically deformable lip portion 53 of the inner elastic seal member 54 is in contact.

In the lower casing 22, the outer surface 41 of its cylindrical portion 17 has a small-diameter cylindrical outer surface 75 with which the inner elastically deformable lip portion 43 of the outer elastic seal member 47 is in contact, the large-diameter cylindrical outer surface 67 having a larger diameter than the small-diameter cylindrical outer surface 75, an annular stepped surface 76 which is disposed between the small-diameter cylindrical outer surface 75 and the large-diameter cylindrical outer surface 67 and with which an annular lower surface 68 of the outer elastic seal member 47 is in contact, and a radially projecting cylindrical outer surface 77 continuously connected to the annular upper surface 20 of the cylindrical portion 17 at its annular upper edge and having a larger diameter than the small-diameter cylindrical outer surface 75 with which the inner elastically deformable lip portion 43 of the outer elastic seal member 47 is in contact, while the inner surface 48 of its cylindrical portion 17 has a small-diameter cylindrical inner surface 79 continuously connected to an annular inner surface 78 of the lower annular plate-like portion 15, a large-diameter cylindrical inner surface 80 having a larger diameter than the small-diameter cylindrical inner surface 79 and continuously connected to the annular upper surface 20 of the cylindrical portion 17, an intermediate cylindrical inner surface 81 having a larger diameter than the small-diameter cylindrical inner surface 79 but having a smaller diameter than the large-diameter cylindrical inner surface 80 and with which the outer elastically deformable lip portion 50 of the inner elastic seal member 54 is in contact, a lower annular stepped surface 83 which is disposed between the small-diameter cylindrical inner surface 79 and the intermediate cylindrical inner surface 81 and with which an annular lower surface 82 of the inner elastic seal member 54 is in contact, an upper annular stepped surface 84 disposed between the intermediate cylindrical inner surface 81 and the large-diameter cylindrical inner surface 80, and an axially projecting annular stepped surface 86 which is continuously connected to the annular upper edge of the small-diameter cylindrical inner surface 79 of the cylindrical portion 17 at its annular inner edge and which is closer to an annular lower end surface 85 of the inner cylindrical portion 8 of the upper casing 12 in the axial direction than the lower annular stepped surface 83 with which the annular lower surface 82 of the inner elastic seal member 54 is in contact.

The annular lower end surface 85 of the inner cylindrical portion 8 of the upper casing 12, which is continuously connected to the small-diameter cylindrical outer surface 70 of the inner cylindrical portion 8 of the upper casing 12, opposes the lower annular stepped surface 83 and the axially projecting annular stepped surface 86 of the cylindrical portion 17 of the lower casing 22 with an annular gap 87 therebetween.

The small-diameter cylindrical outer surface 75, with which the inner elastically deformable lip portion 43 of the outer elastic seal member 47 is in contact, is disposed in the axial direction between the radially projecting cylindrical outer surface 77 and the annular stepped surface 76 with which the annular lower surface 68 of the outer elastic seal member 47 is in contact, and the lower annular stepped surface 83, with which the annular lower surface 82 of the inner elastic seal member 54 is in contact, is disposed in the radial direction between the axially projecting annular stepped surface 86 and the intermediate cylindrical inner surface 81.

Figure 8:
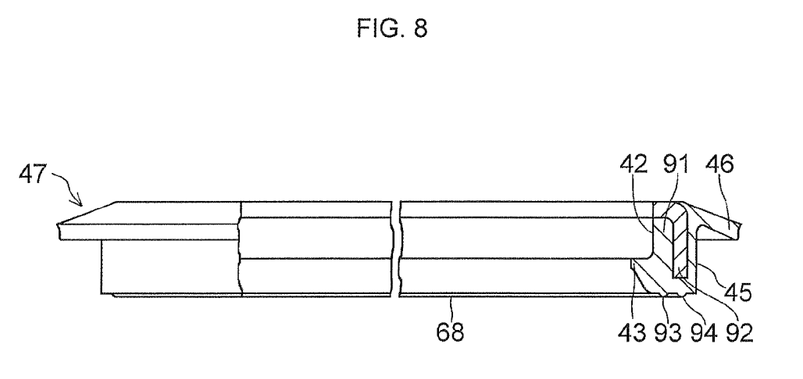
FIG. 8 is an explanatory partial cross-sectional view of an outer elastic seal member shown in FIG. 1.
Figure 9:
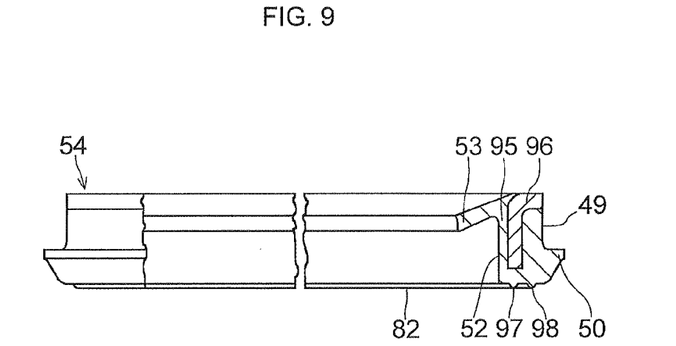
FIG. 9 is an explanatory partial cross-sectional view of an inner elastic seal member shown in FIG. 1.

The outer elastic seal member 47 includes an elastic seal body 91 having the elastically deformable lip portions 43 and 46 and a metal core 92 embedded in the elastic seal body 91, and the annular lower surface 68 of the outer elastic seal member 47 has concentrically arranged and elastically deformable annular projecting surfaces 93 and 94, and is elastically in contact with the annular stepped surface 76 by means of the annular projecting surfaces 93 and 94. Likewise, the inner elastic seal member 54 includes an elastic seal body 95 having the elastically deformable lip portions 50 and 53 and a metal core 96 embedded in the elastic seal body 93, and the annular lower surface 82 of the inner elastic seal member 54 has concentrically arranged and elastically deformable annular projecting surfaces 97 and 98, and is elastically in contact with the lower annular stepped surface 83 by means of the annular projecting surfaces 97 and 98.

Figure 6:
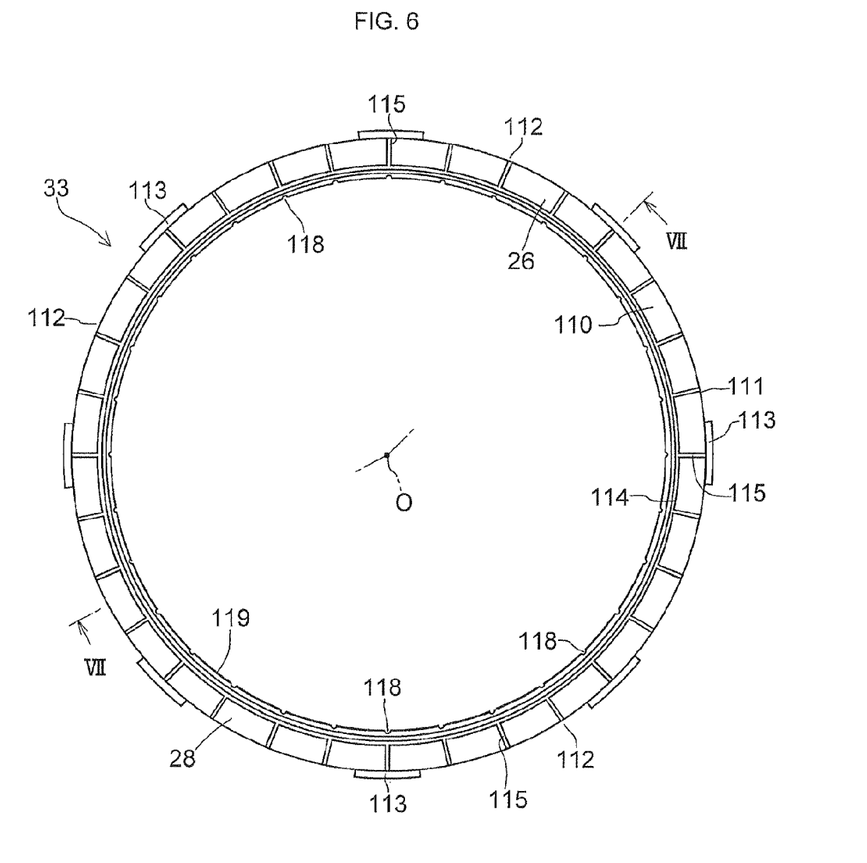
FIG. 6 is an explanatory plan view of a thrust sliding bearing piece shown in FIG. 1.
Figure 7:
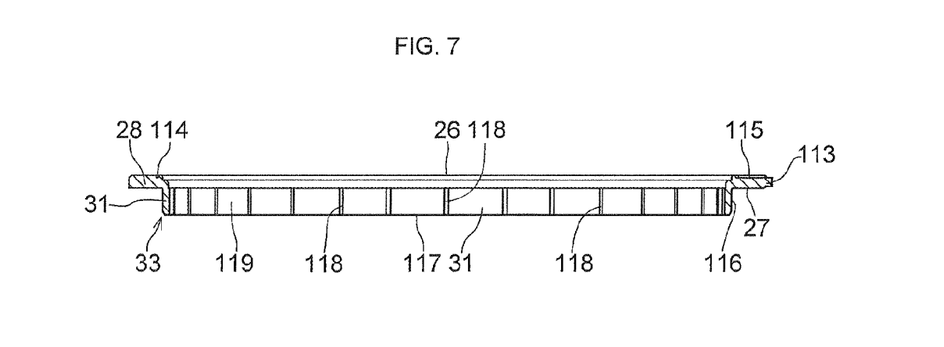
FIG. 7 is an explanatory cross-sectional view, taken in the direction of arrows VII-VII shown in FIG. 6, of the thrust sliding bearing piece shown in FIG. 1.

The annular plate-like portion 28 of the thrust sliding bearing piece 33 includes an annular plate-like portion body 110 having the annular upper surface 26 and a plurality of radially projecting portions 113 which are integrally formed on a cylindrical outer surface 111 of the annular plate-like portion body 110 in such a manner as to radially project from the cylindrical outer surface 111 and to be spaced apart from each other in the R direction, and which define a plurality of recessed portions 112 spaced apart from each other in the R direction to receive the respective ones of the projecting portions 21 of the lower casing 22. The annular upper surface 26 is formed with an annular groove 114 and a plurality of radial grooves 115 which are each open to the annular groove 114 at one end thereof and open to the cylindrical outer surface 111 at the other end thereof, and are arranged in such a manner as to be spaced apart from each other in the R direction, the annular groove 114 and the radial grooves 115 serving as lubricant reservoirs for grease or the like. The cylindrical portion 31 of the thrust sliding bearing piece 33 has a cylindrical outer peripheral surface 116 which is brought into contact with the large-diameter cylindrical inner surface 80 and a cylindrical inner peripheral surface 119 on which axial grooves 118, which are each open on its upper side at the inner annular end portion 29 and open on its lower side at an annular lower surface 117, are formed in such a manner as to be spaced apart from each other at equal distances in the R direction. The cylindrical portion 31 of the thrust sliding bearing piece 33 is disposed between the large-diameter cylindrical outer surface 69 of the outer surface 51 of the inner cylindrical portion 8 of the upper casing 12 and the large-diameter cylindrical inner surface 80 of the inner surface 48 of the cylindrical portion 17 of the lower casing 22 with a cylindrical gap between the large-diameter cylindrical outer surface 69 and the cylindrical inner peripheral surface 119. The axial grooves 118 serve as lubricant reservoirs for grease or the like in the same way as the annular groove 114 and the radial grooves 115.

A piston rod of a strut assembly is disposed in the above-described thrust sliding bearing 1 by being passed through a through hole 122 defined by a cylindrical inner surface 121 of the inner cylindrical portion 8 and through a through hole 124 concentric with the through hole 122 and defined by the annular inner surface 78 of the lower annular plate-like portion 15, the small-diameter cylindrical inner surface 79 of the cylindrical portion 17, and a cylindrical inner surface 123 of the suspended cylindrical portion 19. This thrust sliding bearing 1 is thus mounted between a mechanism for mounting the strut assembly to the vehicle body and an upper spring seat member of the coil spring. With such a thrust sliding bearing 1, when the coil spring is rotated about the axis O in the R direction by the steering operation, the upper casing 12 is similarly rotated relatively in the R direction with respect to the lower casing 22. This rotation of the upper casing 12 in the R direction is effected smoothly by the rotation of the annular lower surface 25 of the upper annular plate-like portion 2 of the upper casing 12 with respect to the annular upper surface 26 of the annular plate-like portion 28 of the thrust sliding bearing piece 33 interposed between the upper casing 12 and the lower casing 22, so that the steering operation is performed without resistance.

According to the thrust sliding bearing 1, the outer elastic seal member 47 is in contact with the small-diameter cylindrical outer surface 75 of the outer surface 41 of the cylindrical portion 17 of the lower casing 22 at its inner elastically deformable lip portion 43 formed integrally on the cylindrical inner surface 42 in such a manner as to project diagonally inwardly and upwardly from that cylindrical inner surface 42, and is also in contact with the truncated cone-shaped inner surface 65 of the inner surface of the outer cylindrical portion 5 of the upper casing 12 at its outer elastically deformable lip portion 46 formed integrally on the cylindrical outer surface 45 in such a manner as to project diagonally outwardly and downwardly from that cylindrical outer surface 45, and is further in contact with the annual stepped surface 76 of the outer surface of the cylindrical portion 17 of the lower casing 22 at its annular lower surface 68. The inner elastic seal member 54 is in contact with the intermediate cylindrical inner surface 81 of the inner surface 48 of the cylindrical portion 17 of the lower casing 22 at its outer elastically deformable lip portion 50 formed integrally on the cylindrical outer surface 49 in such a manner as to project diagonally outwardly and upwardly from that cylindrical outer surface 49, is also in contact with the small-diameter cylindrical outer surface 70 of the outer surface 51 of the inner cylindrical portion 8 of the upper casing 12 at its inner elastically deformable lip portion 53 formed integrally on the cylindrical inner surface 52 in such a manner as to project diagonally inwardly and downwardly from that cylindrical inner surface 52, and is further in contact with the lower annular stepped surface 83 of the inner surface 48 of the cylindrical portion 17 of the lower casing 22 at its annular lower surface 82. Therefore, even under severe conditions, it is possible to effectively prevent the ingress of dust, muddy water and the like into an annular space 131, which is located between the annular lower surface 25 of the upper annular plate-like portion 2 and the annular upper surface 20 of the cylindrical portion 17 of the lower casing 22 to accommodate the annular plate-like portion 28 of the thrust sliding bearing piece 33, through the annular gap 62 between the annular lower end surface 61 of the outer cylindrical portion 5 of the upper casing 12 and the annular upper surface 16 of the lower annular plate-like portion 15 of the lower casing 22 and through the annular gap 87 between the annular lower end surface 85 of the inner cylindrical portion 8 of the upper casing 12 and the lower annular stepped surface 83 and the axially projecting annular stepped surface 86 of the cylindrical portion 17 of the lower casing 22, thereby making it possible to reduce the generation of abnormal noise due to the ingress of dust, muddy water and the like.

In addition, according to the thrust sliding bearing 1, since the annular lower surface 68 of the outer elastic seal member 47 has the elastically deformable annular projecting surfaces 93 and 94 and the annular lower surface 82 of the inner elastic seal member 54 has the elastically deformable annular projecting surfaces 97 and 98, the sealability of the annular lower surface 68 of the outer elastic seal member 47 and the annular lower surface 82 of the inner elastic seal member 54 can be improved by the elastic deformation of these annular projecting surfaces 93 and 94 as well as 97 and 98, so that the ingress of dust, muddy water and the like into the annular space 131 accommodating the annular plate-like portion 28 of the thrust sliding bearing piece 33 can be prevented more effectively, thereby making it possible to more satisfactorily reduce the generation of abnormal noise due to the ingress of dust, muddy water and the like.

Furthermore, according to the thrust sliding bearing 1, since the radially projecting cylindrical outer surface 77 and the axially projecting annular stepped surface 86 are provided, it is possible to satisfactorily effect the positioning of the outer elastic seal member 47 and the inner elastic seal member 54.

Figure 10:
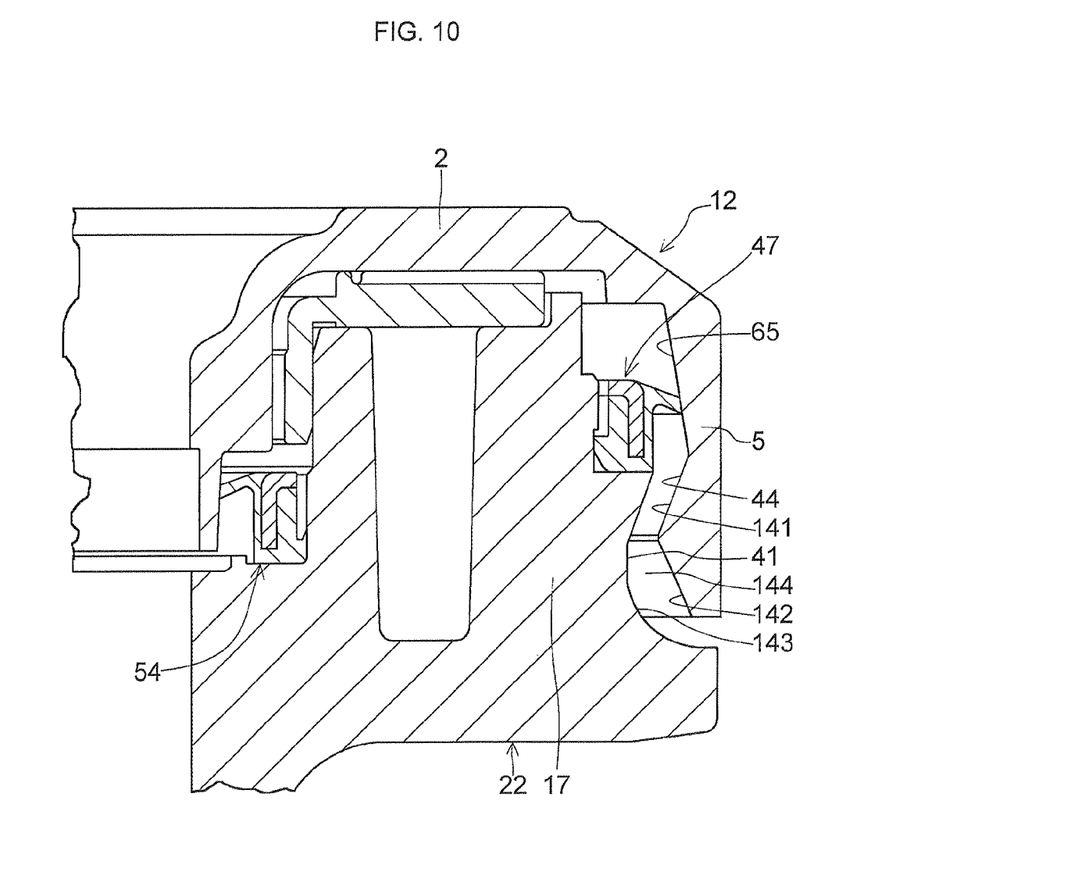
FIG. 10 is an explanatory enlarged front cross-sectional view, corresponding to FIG. 4, of the right portion in accordance with another embodiment of the present invention.
Figure 11:
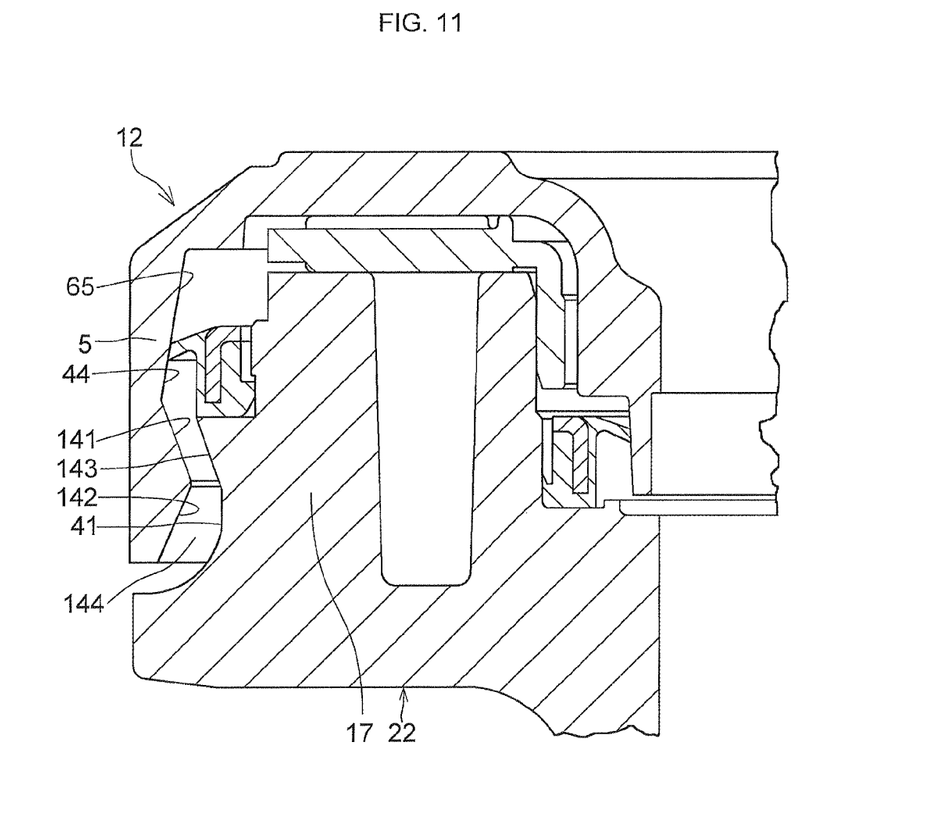
FIG. 11 is an explanatory enlarged front cross-sectional view, corresponding to FIG. 5, of the left portion in accordance with the other embodiment shown in FIG. 10.
Figure 12:
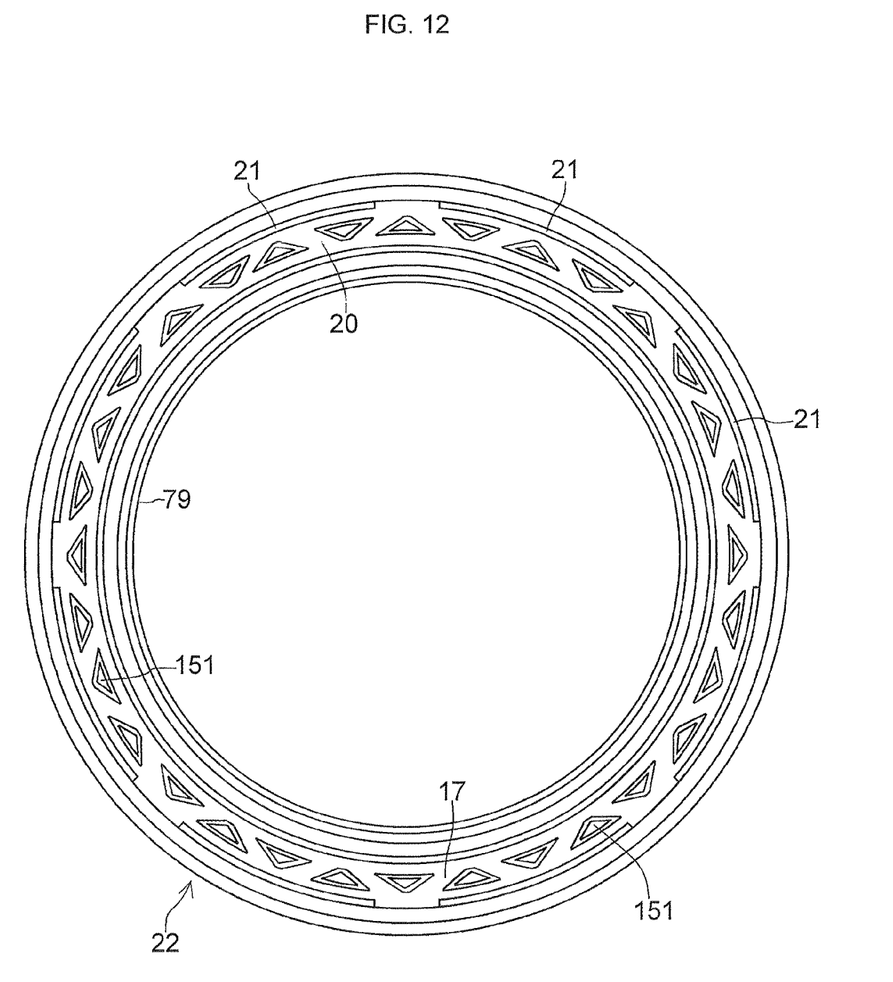
FIG. 12 is an explanatory plan view, corresponding to FIG. 3, of the lower casing in accordance with the other embodiment shown in FIG. 10.

With the above-described thrust sliding bearing 1, although the inner surface 44 of the outer cylindrical portion 5 of the upper casing 12 has the truncated cone-shaped inner surface 65 and the cylindrical inner surface 66, as shown in FIGS. 10 to 12, the inner surface 44 of the outer cylindrical portion 5 of the upper casing 12 may have, instead of the cylindrical inner surface 66 and in addition to the truncated cone-shaped inner surface 65, an upwardly truncated conical surface 141 continuously connected to the annular lower end of the truncated cone-shaped inner surface 65 at its large-diameter annular upper end and having a small-diameter annular lower end smaller in diameter than that large-diameter annular upper end, as well as a downwardly truncated conical surface 142 continuously connected to the small-diameter annular lower end of the upwardly truncated conical surface 141 at its small-diameter annular upper end and having a large-diameter annular lower end larger in diameter than that small-diameter annular upper end. In this case, the outer surface 41 of the cylindrical portion 17 of the lower casing 22 may also have, instead of the large-diameter cylindrical outer surface 67, a curved recessed surface 143 of a complementary shape to the upwardly truncated conical surface 141 and the downwardly truncated conical surface 142, and the upwardly truncated conical surface 141 and the downwardly truncated conical surface 142 may oppose such a curved recessed surface 143 with a gap 144 therebetween.

In addition, with the thrust sliding bearing 1, a plurality of cylinder-shaped or triangular prism-shaped recesses 151, which are arranged by being spaced apart from each other at equal distances in the R direction and are open at the annular upper surface 20, may be provided in the cylindrical portion 17 of the lower casing 22 in order to attain light weight, uniform wall thickness, and the like.

DESCRIPTION OF REFERENCE NUMERALS

1: thrust sliding bearing
2: upper annular plate-like portion
3: outer annular end portion
4: upper annular end portion
5: outer cylindrical portion
6: inner annular end portion
7: upper annular end portion
8: inner cylindrical portion
9: annular upper surface
10: upper surface
11: annular projecting portion
12: upper casing
15: lower annular plate-like portion
16: annular upper surface
17: cylindrical portion
18: annular lower surface
19: suspended cylindrical portion
20: annular upper surface
21: projecting portion
22: lower casing
26: annular upper surface
27: annular lower surface
28: annular plate-like portion
29: inner annular end portion
30: upper annular end portion
31: cylindrical portion
33: thrust sliding bearing piece
41: outer surface
42: cylindrical inner surface
43: lip portion
44: inner surface
45: cylindrical outer surface
46: lip portion
47: outer elastic seal member
48: inner surface
49: cylindrical outer surface
50: lip portion
51: outer surface
52: cylindrical inner surface
53: lip portion
54: inner elastic seal member

The invention claimed is:

1. A synthetic resin-made thrust sliding bearing comprising:
a synthetic resin-made upper casing which includes an upper annular plate portion, an outer cylindrical portion and an inner cylindrical portion;
a synthetic resin-made lower casing which is superposed on said upper casing so as to be rotatable with respect to said upper casing and includes a cylindrical portion;
a synthetic resin-made thrust sliding bearing piece which includes an annular plate portion in contact with the upper annular plate portion of said upper casing and the cylindrical portion of said lower casing, respectively, and a cylindrical portion interposed between the inner cylindrical portion of said upper casing and the cylindrical portion of said lower casing;
an outer elastic seal member which is in contact with an outer surface of the cylindrical portion of said lower casing at an inner elastically deformable lip portion thereof formed integrally on a cylindrical inner surface thereof in such a manner as to project diagonally inwardly and upwardly from the cylindrical inner surface, is in contact with a truncated cone-shaped inner surface of the outer cylindrical portion of said upper casing at an outer elastically deformable lip portion thereof formed integrally on a cylindrical outer surface thereof in such a manner as to project diagonally outwardly and downwardly from the cylindrical outer surface, and is in contact with an annular stepped surface of the outer surface of the cylindrical portion of said lower casing, at an annular lower surface thereof, respectively; and
an inner elastic seal member which is in contact with an inner surface of the cylindrical portion of said lower casing at an outer elastically deformable lip portion thereof formed integrally on a cylindrical outer surface thereof in such a manner as to project diagonally outwardly and upwardly from the cylindrical outer surface, is in contact with a small-diameter cylindrical outer surface of the inner cylindrical portion of said upper casing at an inner elastically deformable lip portion thereof formed integrally on a cylindrical inner surface thereof in such a manner as to project diagonally inwardly and downwardly from the cylindrical inner surface, and is in contact with a lower annular stepped surface of the inner surface of the cylindrical portion of said lower casing at an annular lower surface thereof, respectively.

2. The synthetic resin-made thrust sliding bearing according to claim 1, wherein said lower casing has a plurality of projecting portions formed integrally on the annular upper surface of the cylindrical portion thereof and spaced apart from each other in the direction about the axis, and the annular plate portion of said thrust sliding bearing piece has a plurality of recessed portions or notches for receiving respective ones of the plurality of projecting portions of said lower casing.

3. The synthetic resin-made thrust sliding bearing according to claim 1, wherein the annular lower surface of said outer elastic seal member has at least one elastically deformable annular projecting surface.

4. The synthetic resin-made thrust sliding bearing according to claim 1, wherein the annular lower surface of said inner elastic seal member has at least one elastically deformable annular projecting surface.

* * * * *